United States Patent
Bain et al.

(10) Patent No.: US 12,431,961 B2
(45) Date of Patent: Sep. 30, 2025

(54) MODULAR ARCHITECTURE AVIONICS

(71) Applicant: Maxar Space LLC, Palo Alto, CA (US)

(72) Inventors: Harold Mark Bain, Palo Alto, CA (US); Yann Renault, Pacifica, CA (US); Jennifer Lynn Lazbin, Gilbert, AZ (US); Jonathan Edward Goldsmith, San Francisco, CA (US)

(73) Assignee: Maxar Space LLC, Palo Alto, CA (US)

( * ) Notice: Subject to any disclaimer, the term of this patent is extended or adjusted under 35 U.S.C. 154(b) by 711 days.

(21) Appl. No.: 17/835,866

(22) Filed: Jun. 8, 2022

(65) Prior Publication Data

US 2023/0136484 A1   May 4, 2023

Related U.S. Application Data

(60) Provisional application No. 63/275,191, filed on Nov. 3, 2021.

(51) Int. Cl.
*H04B 7/185* (2006.01)
*B64G 1/22* (2006.01)
(Continued)

(52) U.S. Cl.
CPC .............. *H04B 7/185* (2013.01); *B64G 1/22* (2013.01); *B64G 1/428* (2013.01); *G06F 11/2023* (2013.01); *H04L 67/12* (2013.01)

(58) Field of Classification Search
CPC .......... B64G 1/22; B64G 1/244; B64G 1/247; B64G 1/428; G06F 11/2023;
(Continued)

(56) References Cited

U.S. PATENT DOCUMENTS 9,104,639 B2   8/2015   Koritnik et al.
9,413,162 B2   8/2016   Brouwer et al.
(Continued)

FOREIGN PATENT DOCUMENTS

EP            1625484 B1    9/2009
WO      WO2006/052397 A1   5/2006

OTHER PUBLICATIONS

Communication pursuant to Rules 161(1) and 162 EPC dated Jun. 11, 2024, European Patent Application No. 22786609.2-1203.
(Continued)

*Primary Examiner* — Liton Miah
(74) *Attorney, Agent, or Firm* — Pearl Cohen Zedek Latzer Baratz LLP

(57) ABSTRACT

A distributed computer system for a spacecraft is disclosed. The system has multiple computer nodes, each controlling a different aspect of a mission of the spacecraft. Each node includes a control circuit(s) that controls a set of components, a router processor, and a programmable processor. The programmable processor of each respective computer node issue commands to the control circuit(s) of the respective computer node to carry out an aspect of the mission associated with the respective computer node. Upon failure of the programmable processor in a particular computer node, a healthy programmable processor send commands to the router processor in the particular computer node The router processor of the particular computer node routes the commands received from the remote programmable processor to the control circuit(s) in the particular computer node to control the set of components to carry out the aspect of the mission associated with particular computer node.

15 Claims, 9 Drawing Sheets

(51) Int. Cl.
    *B64G 1/42*     (2006.01)
    *G06F 11/20*     (2006.01)
    *H04L 67/12*     (2022.01)

(58) Field of Classification Search
    CPC ............... G06F 11/2028; G06F 11/203; G06F 11/2033; G06F 11/2035; G06F 11/2048; H04B 7/185; H04B 7/18519; H04L 67/12
    See application file for complete search history.

(56) References Cited

U.S. PATENT DOCUMENTS

| | | | |
|---|---|---|---|
| 9,612,900 | B2 | 4/2017 | Anderson et al. |
| 10,025,307 | B2 | 7/2018 | Downey et al. |
| 2007/0186126 | A1 | 8/2007 | Smith et al. |
| 2010/0218035 | A1 | 8/2010 | Avizienis |
| 2011/0252268 | A1 | 10/2011 | Avizienis |
| 2013/0232237 | A1* | 9/2013 | Zulch, III ............... H04L 67/12 709/220 |
| 2014/0281802 | A1 | 9/2014 | Coe |
| 2018/0197357 | A1* | 7/2018 | Haukom ............. G07C 5/0816 |
| 2021/0044963 | A1* | 2/2021 | Thakkar .................. H04L 12/18 |
| 2021/0208860 | A1* | 7/2021 | Freeman ............... G06F 9/5055 |
| 2022/0131598 | A1* | 4/2022 | Rang ..................... H04L 12/413 |

OTHER PUBLICATIONS

International Search Report & The Written Opinion of the International Searching Authority dated Jan. 2, 2023, International Application No. PCT/US2022/043298.

Ludtke, Daniel, et al, "OBC-NG: Towards a reconfigurable onvoard computing architecture for spacecraft," 2014 IEEE Aerospace Conference, Mar. 1, 2014, 14 pages.

Response to Communication pursuant to Rules 161(1) and 162 EPC dated Dec. 11, 2024, European Patent Application No. 22786609.2-1203.

Fayyaz, Muhammad, et al., "Fault-Tolerant Distributed Approach to Satellite On-Board Computer Design," 2014 IEEE Aerospace Conference, Jun. 2014, 12 pages.

Palmintier, Bryan, et al., "A Distributed Computing Architecture for Small Satellite and Multi-Spacecraft Missions," 16th Annual AIAA/USU Conference on Small Satellites, Jul. 2002, 11 pages.

Fuchs, Christian M., et al., "Bringing Fault-Tolerant GigaHertz-Computing to Space—A Multi-State Software-Side Fault-Tolerance Approach for Miniaturized Spacecraft," 26th IEEE Asian Test Symposium, Nov. 2017, 8 pages.

Siewiorek, Daniel P., et al., "Fault-Tolerant Architectures for Space and Avionics Applications," Electrical and Computer Enginerring Department, Carnegie Mellon University, Pittsburgh PA, Oct. 2005, 19 pages.

* cited by examiner

MODULAR ARCHITECTURE AVIONICS

PRIORITY DATA

The present application claims priority to U.S. Provisional Patent Application No. 63/275,191, filed on Nov. 3, 2021, entitled "MODULAR ARCHITECTURE AVIONICS", which application is incorporated by reference herein in its entirety.

BACKGROUND

The number of space activities and the number of entities performing space activities has been increasing. For purposes of this document, space activities are functions performed completely or partially in space. The term "space" refers to being beyond the Earth's atmosphere, in orbit around the Earth, or at a distance from the Earth's surface that is equivalent to (or greater than) a distance of an object in orbit around the Earth. Examples of space activities include communication, transport, solar system exploration and scientific research. For example, the International Space Station is an orbiting research facility that functions to perform world-class science and research that only a microgravity environment can provide. Other activities performed in space can also be considered space activities.

A spacecraft typically has a mission, which could include providing services. For example, satellites in geosynchronous orbit are used to provide communications (e.g., Internet Access, television broadcasts, telephone connectivity) and data gathering services (e.g., weather data, air traffic control data, etc.). Because longitudes ("slots") at which spacecraft may be stationed in geosynchronous orbit are limited, there is a strong market demand to maximize the revenue generated from each slot. As a result, satellites disposed in geosynchronous orbit have become larger, more complex and expensive, with satellite operators demanding higher power, more payload throughput, and multi-payload spacecraft.

Hence, the spacecraft will have a number of different sub-systems to handle different aspects of the mission. For example, one sub-system could handle propulsion, another sub-system could control attitude of the spacecraft, other sub-systems could operate payloads such as antennas or solar arrays. Each of these sub-systems may have components that need to be controlled in order to achieve some aspect of the mission. A computer system may be used to control the components within the sub-system.

Due in part to the extreme conditions in space, an element within a sub-system in the spacecraft could fail. One technique to handle such failures is to include a redundant sub-system on the spacecraft. The redundant sub-system serves as a backup in the event a primary sub-system fails. That is, the redundant sub-system takes over the function of the failing sub-system. However, the redundant sub-system is not used unless the primary sub-system fails. While this technique is effective, a redundant sub-system adds to the cost and mass of the spacecraft.

BRIEF DESCRIPTION OF THE DRAWINGS

Aspects of the present disclosure are illustrated by way of example and are not limited by the accompanying figures for which like references indicate the same or similar elements.

DETAILED DESCRIPTION

Figure 1:
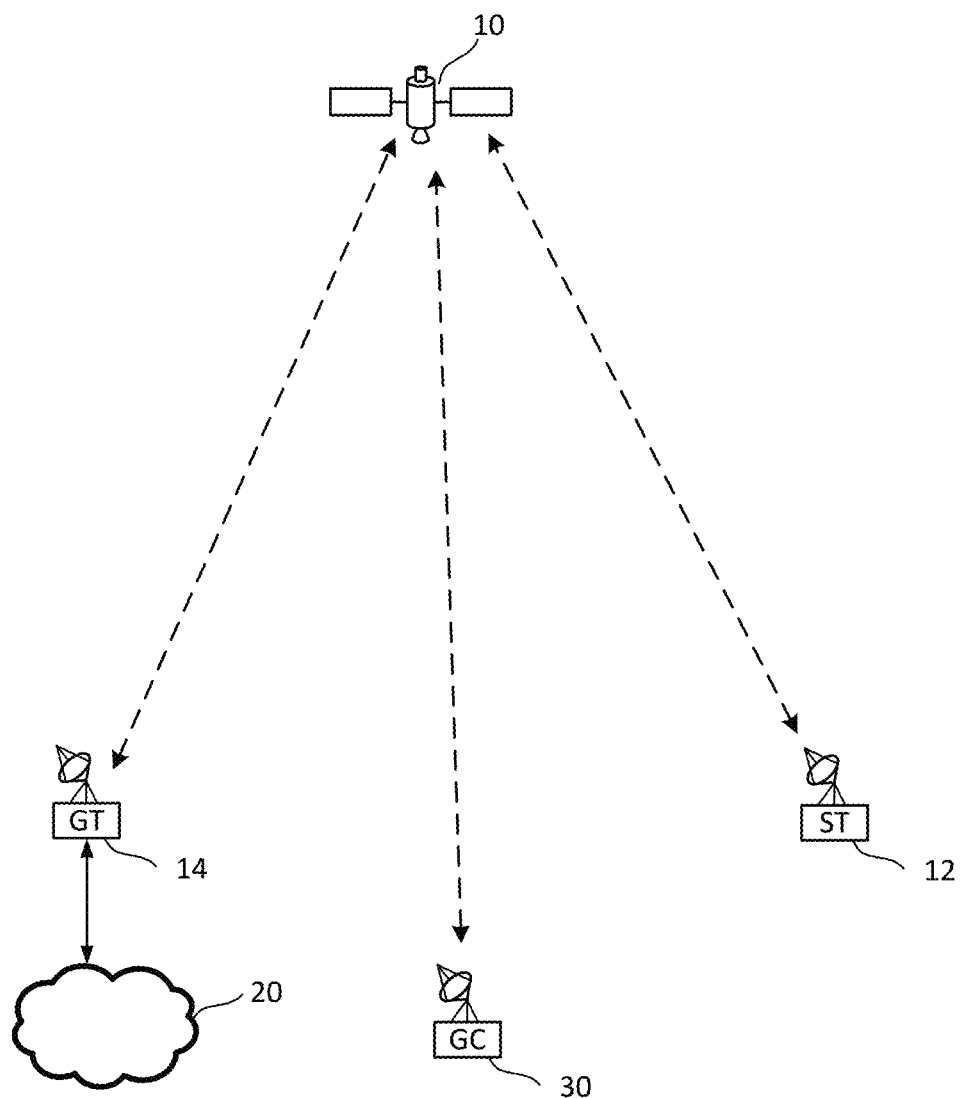
FIG. 1 is a block diagram of a spacecraft system.

A distributed computer system for a spacecraft is disclosed. An embodiment includes a system level architecture design. In an embodiment, there are multiple computer nodes. Each nodes may control a different aspect of a mission of the spacecraft. For example, one computer nodes may control Attitude Control System (ACS), one computer nodes may control propulsion, one computer stack may control a repeater payload, and one computer stack may control an antenna payload.

In an embodiment, each computer node includes a computer stack that may contain computer boards. Each computer stack is connected to a set of components that carry out an aspect of a mission of the spacecraft that is assigned by default to the respective computer stack. Each stack also includes one or more control circuits that are configured to control the set of components. Each computer stack includes a router processor and a programmable processor. The programmable processor of the respective computer stack is programmed to issue commands to the one or more control circuits of the respective computer stack to control the set of the components connected to the respective computer stack to carry out the aspect of the mission associated with the respective computer node. In response to a failure of the programmable processor in another of the computer stacks, the programmable processor send commands to the router processor in the other computer stack to control the set of the components connected to the other computer stack to carry out the aspect of the mission associated with the other computer stack. The router processor of the stack with the failing programmable processor routes the commands received from the remote programmable processor to the one or more control circuits in the stack with the failing programmable processor to control the set of the components connected to the stack with the failing programmable processor to carry out the aspect of the mission associated with the stack with the failing programmable processor.

The computer stacks may be connected to each other by a high speed data link (e.g., 1G Ethernet). Each computer stack may contain a computer board that runs flight software to control the aspect of the mission for which the stack is responsible. The computer board may have a programmable processor that executes processor executable instructions in order to run the flight software. The computer board may be fully capable of running all the different flight software packages used in the spacecraft. Because each computer board can run every flight software package, system level redundancy can be accomplished by allowing each computer board to be capable of functionally replacing each other. For example, the ACS computer board can also run the propulsion computer board software. Thus, the need for having a second computer board in each stack for redundancy is removed.

In an embodiment, the ability to take over all the computer stack functions from a remote computer board is accomplished by a backdoor data access. This may be accomplished by having a separate data routing function (e.g., backplane communication link) that handles all intra-stack communications. If a programmable processor on a computer board fails, the commands from the remote processor are routed by the router processor directly to the computer stack backplane, bypassing the failed programmable processor. Thus, all the secondary boards in the computer stack can be controlled by a remotely located programmable processor.

FIG. 1 is a block diagram of a spacecraft system that can use an embodiment of modular architecture avionics. The system of FIG. 1 includes spacecraft 10, subscriber terminal 12, gateway 14, and ground control terminal 30. Subscriber terminal 12, gateway 14, and ground control terminal 30 are examples of ground terminals. In one embodiment, spacecraft 10 is a satellite; however, spacecraft 10 can be other types of spacecrafts (e.g., shuttle, space station, inter-planet traveling craft, rocket, etc.). Spacecraft 10 may be located, for example, at a geostationary or non-geostationary orbital location. Spacecraft 10 can also be a Low Earth Orbit satellite. Spacecraft 10 is communicatively coupled by at least one wireless feeder link to at least one gateway terminal 12 and by at least one wireless user link to a plurality of subscriber terminals (e.g., subscriber terminal 12) via an antenna system. Gateway terminal 14 is connected to the Internet 20. The system allows spacecraft 10 to provide internet connectivity to a plurality of subscriber terminals (e.g., subscriber terminal 12) via gateway 14. Ground control terminal 30 is used to monitor and control operations of spacecraft 10. Spacecraft can vary greatly in size, structure, usage, and power requirements, but when reference is made to a specific embodiment for the spacecraft 10, the example of a communication satellite will often be used in the following, although the techniques are more widely applicable, including other or additional payloads such as for an optical satellite.

Figure 2:
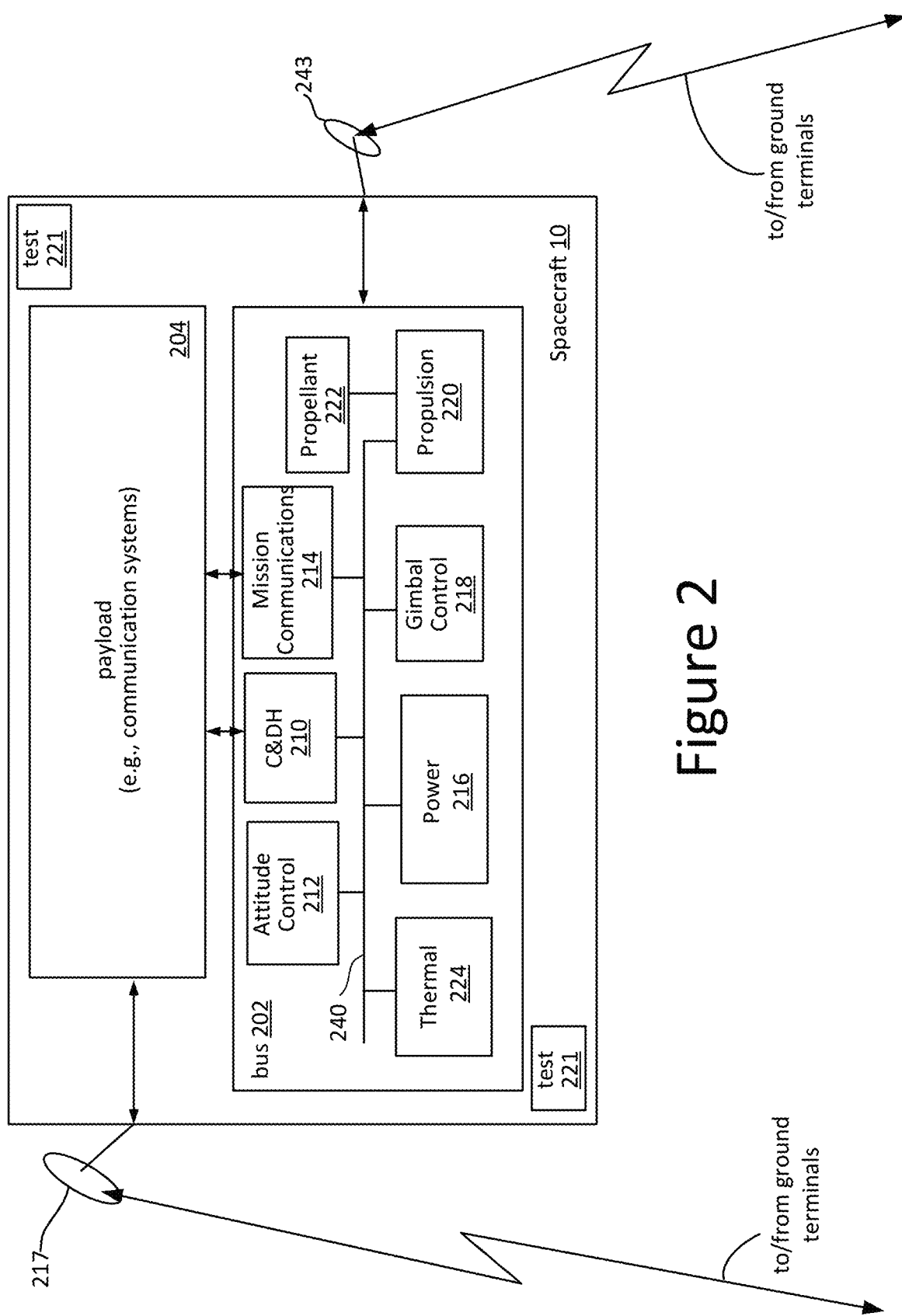
FIG. 2 is a block diagram of an example spacecraft.

FIG. 2 is a block diagram of one embodiment of spacecraft 10, which in one example (as discussed above) is a satellite. In one embodiment, spacecraft 10 includes a bus 202 and a payload 204 carried by bus 202. Some embodiments of spacecraft 10 may include more than one payload. The payload provides the functionality of communication, sensors and/or processing systems needed for the mission of spacecraft 10.

In general, bus 202 is the spacecraft that houses and carries the payload 204, such as the components for operation as a communication satellite. The bus 202 includes a number of different functional sub-systems or modules, some examples of which are shown. Each of the functional sub-systems typically include electrical systems, as well as mechanical components (e.g., servos, actuators) controlled by the electrical systems. These include a command and data handling sub-system (C&DH) 210, attitude control systems 212, mission communication systems 214, power subsystems 216, gimbal control electronics 218 that be taken to include a solar array drive assembly, a propulsion system 220 (e.g., thrusters), propellant 222 to fuel some embodiments of propulsion system 220, and thermal control subsystem 224, all of which are connected by an internal communication network 240, which can be an electrical bus (a "flight harness") or other means for electronic, optical or RF communication when spacecraft is in operation. Also represented are an antenna 243, that is one of one or more antennae used by the mission communication systems 214 for exchanging communications for operating of the spacecraft with ground terminals, and a payload antenna 217, that is one of one or more antennae used by the payload 204 for exchanging communications with ground terminals, such as the antennae used by a communication satellite embodiment. The spacecraft can also include a number of test sensors 221, such as accelerometers that can used when performing test operations on the spacecraft. Other equipment can also be included.

The command and data handling module 210 includes any processing unit or units for handling command control functions for spacecraft 10, such as for attitude control functionality and orbit control functionality. The attitude control systems 212 can include devices including torque rods, wheel drive electronics, and control momentum gyro control electronics, for example, that are used to monitor and control the attitude of the space craft. Mission communication systems 214 includes wireless communication and processing equipment for receiving telemetry data/commands, other commands from the ground control terminal 30 to the spacecraft and ranging to operate the spacecraft. Processing capability within the command and data handling module 210 is used to control and operate spacecraft 10. An operator on the ground can control spacecraft 10 by sending commands via ground control terminal 30 to mission communication systems 214 to be executed by processors within command and data handling module 210. In one embodiment, command and data handling module 210 and mission communication system 214 are in communication with payload 204. In some example implementations, bus 202 includes one or more antennae as indicated at 243 connected to mission communication system 214 for wirelessly communicating between ground control terminal 30 and mission communication system 214. Power subsystems 216 can include one or more solar panels and charge storage (e.g., one or more batteries) used to provide power to spacecraft 10. Propulsion system 220 (e.g., thrusters) is used for changing the position or orientation of spacecraft 10 while in space to move into orbit, to change orbit or to move to a different location in space. The gimbal control electronics 218 can be used to move and align the antennae, solar panels, and other external extensions of the spacecraft 10.

In one embodiment, the payload 204 is for a communication satellite and includes an antenna system (represented by the antenna 217) that provides a set of one or more beams (e.g., spot beams) comprising a beam pattern used to receive wireless signals from ground stations and/or other spacecraft, and to send wireless signals to ground stations and/or other spacecraft. In some implementations, mission communication system 214 acts as an interface that uses the antennae of payload 204 to wirelessly communicate with ground control terminal 30. In other embodiments, the payload could alternately or additionally include an optical payload, such as one or more telescopes or imaging systems along with their control systems, which can also include RF communications to provide uplink/downlink capabilities.

Figure 3:
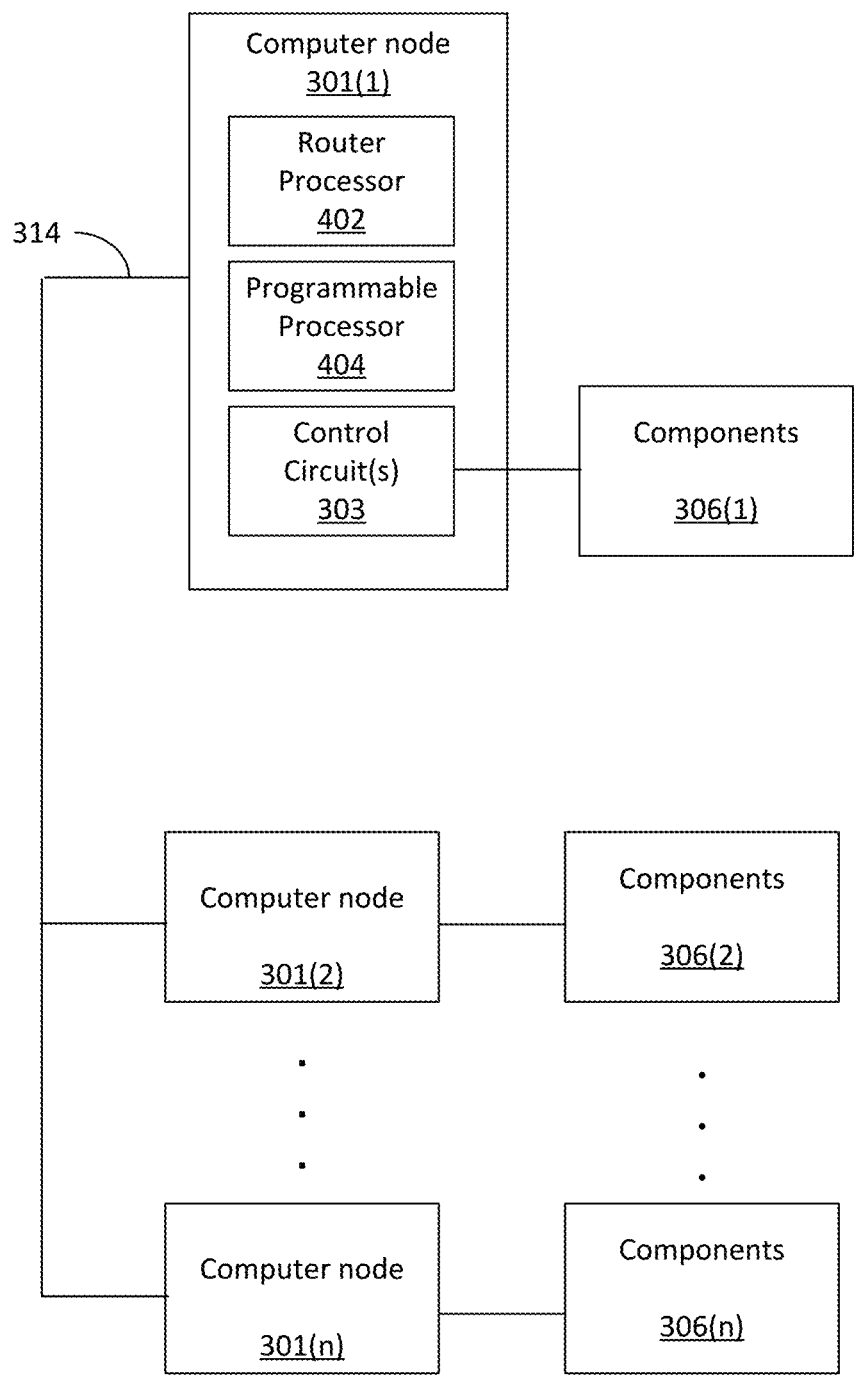
FIG. 3 depicts one embodiment of a distributed computer system for a spacecraft.

FIG. 3 depicts one embodiment of a distributed computer system 300 for a spacecraft 10. The distributed computer system 300 has a number of computer nodes 301(1), 301(2), . . . 301(n). In general, there are two or more computer nodes 301. Each computer node 301 is connected to a set of one or more components 306. Specifically, computer node 301(1) is connected to components 306(1), computer node 301(2) is connected to components 306(2), and computer node 301(n) is connected to components 306(n). The components 306 are responsible for carrying out some aspect of the mission of the spacecraft. For example, the components 306 connected to one of the computer nodes 301 might be responsible for propulsion, the components 306 connected to another of the computer nodes 301 might be responsible for the antenna operation, etc. Each computer node 301 has one or more control circuits 303 that are able to control the components 306 connected to the computer node 301.

In an embodiment, each computer node 301 has a programmable processor 404 and a router processor 402. The programmable processor 404 in each respective node 301 is able to execute flight software to control the computer node 301 in which it resides. By controlling the computer node 301 the various components 306 connected to the node 301 are controlled. In an embodiment, the programmable processor 404 of each respective computer node 301 is also able to execute the flight software to control other nodes 301. This allows the programmable processor 404 in any of the computer nodes 301 to take over control of a computer node 301 in another computer node 301 in the event that the programmable processor 404 in the other computer node 301 is not operational.

One or more communication links 314 connect the various computer nodes 301. The communication links 314 allows the various computer nodes 301 to communicate with each other. The communication links 314 may include cables or the like. The communication links 314 are part of a communication network that allows the computer nodes 301 to communicate with each other. In one embodiment, the communication network is an Ethernet (e.g., 1G Ethernet). In an embodiment, both the programmable processor 404 and the router processor 402 have access to the communication network.

In an embodiment, both the programmable processor 404 and the router processor 402 of a respective node 301 are communicatively coupled to the control circuits 303 in that respective node 301. In one embodiment, each computer node 301 has a backplane link (not depicted in FIG. 3) over which the programmable processor 404 and the router processor 402 communicate with the control circuits 303. The programmable processor 404 may sends commands to the control circuit(s) 301 in its node to command the control circuit(s) 301 to control the components 306. In an embodiment, when a programmable processor 404 takes over for a non-operational programmable processor 404 in another node the programmable processor 404 communicates with the router processor 402 in the node with the non-operational programmable processor 404. For example, the programmable processor 404 may send commands for the control circuits 303 in the other node to execute. The router processor 402 in the node with the non-operational programmable processor 404 forwards these commands to the control circuits 303 in the node with the non-operational programmable processor 404. Therefore, the programmable processor 404 is able to remotely control the control circuits 303 in the node 301 having the non-operational programmable processor 404.

Figure 3A:
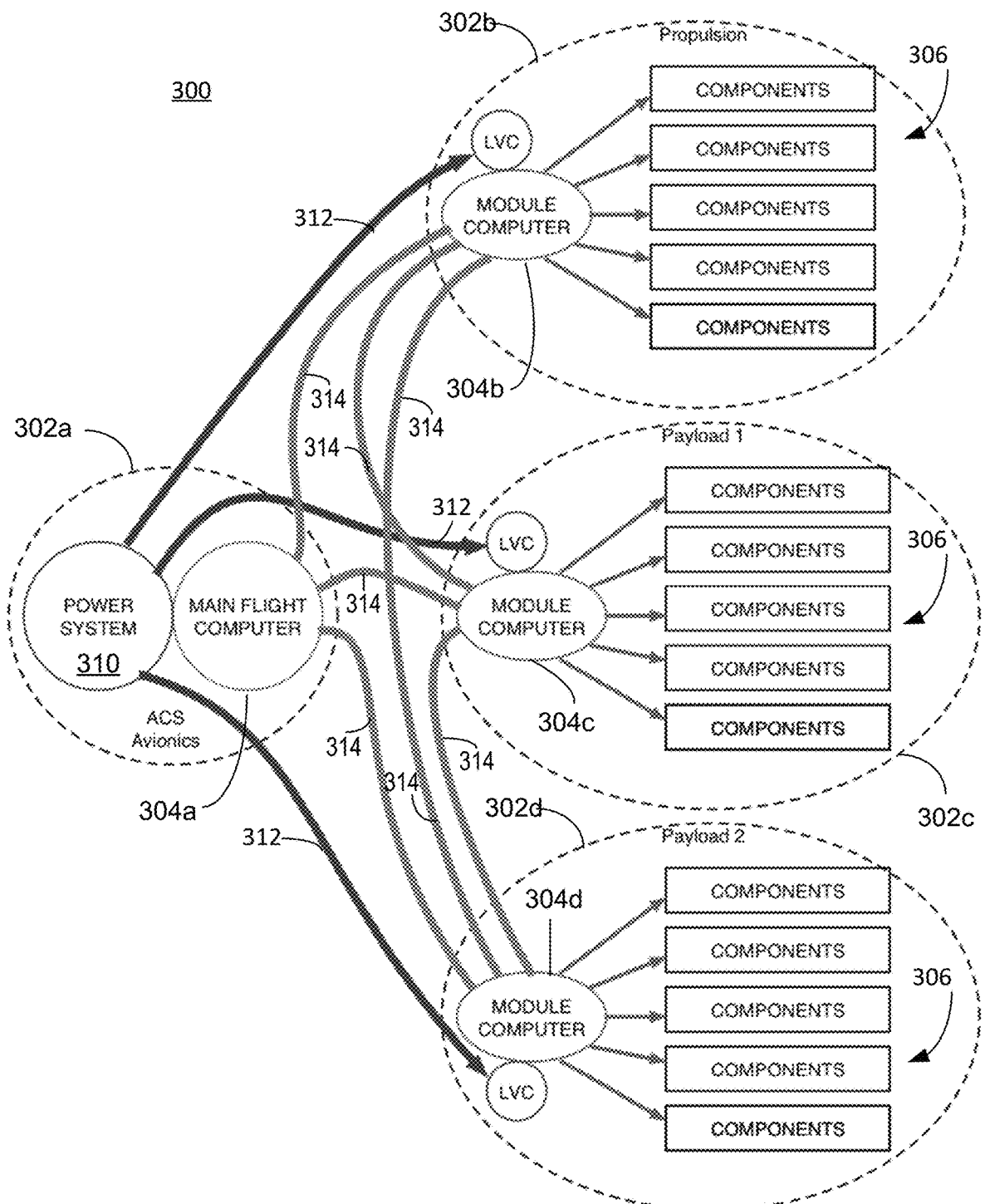
FIG. 3A depicts one embodiment of a distributed computer system for a spacecraft that is divided into different modules.

FIG. 3A depicts one embodiment of a distributed computer system 300 for a spacecraft 10. FIG. 3A shows further details of one embodiment of the distributed computer system 300 of FIG. 3. The distributed computer system 300 in FIG. 3A is divided into a number of modules 302a-302d. Each module contains a module computer 304 and its associated components 306. The module computer 304 is one embodiment of a computer node 301. In an embodiment, each module 302 is primarily responsible for a different aspect of the satellite's mission. Each module 302 may be located in a different area of the spacecraft. The example in FIG. 3A depicts and ACS module 302a, propulsion module 302b, a first payload (Payload 1) module 302c, and a second payload (Payload 2) module 302d. As one example, first payload (Payload 1) module may be for RF communication and the second payload (Payload 2) module 302d may be for antennas. There are numerous way in which the different aspect of the satellite's mission may be divided between the modules 302; therefore, the example in FIG. 3A will be understood to be non-limiting.

Each of the modules 302 has a module computer 304. In some embodiments, the module computer 304 is referred to as a computer stack. In an embodiment, each module computer 304 is primarily responsible for a different aspect of the satellite's mission. The example in FIG. 3A depicts a main flight computer stack 304a in the ACS module 302a, module computer 304b in the propulsion module 302b, module computer 304c in the first payload (Payload 1) module 302c, and module computer 304d in the second payload (Payload 2) module 302d. In an embodiment, the main flight computer 304a runs the functions on the main panel, power control, main flight code, and ACS specific tasks. In an embodiment, module computer 304b runs the functions of the propulsion area, valves, and thrusters. In an embodiment, module computer 304c is a repeater payload computer stack that runs all the RF payload equipment, switches, and TWTA. In an embodiment, module computer 304d is an antenna computer stack that runs all the antenna equipment, pyros, heaters, thermistors. Each of the modules 302 may have a number of components 306, which could include heaters, wheels, thermistors, sensors, pyro releases, switches, etc. In an embodiment, a programmable processor in a module computer 304 is able to take over for a failing programmable processor of another module computer 304.

A high speed communication network connects the various module computers 304. The high speed communication network allows the various module computers 304 to communicate with each other. The high speed communication network has a number of high speed communication links 314. The high speed communication links 314 may include cables or the like. However, wireless communication links are also possible. In one embodiment, the high speed communication network is an Ethernet (e.g., 1G Ethernet). A power system 310 provides power to the various modules 302. Power cables 312 are depicted from the power system 310 in the ASC module 302a to the other module 302.

In an embodiment, each module computer 304 has a number of computer boards. The computer boards may be compliant with a VPX (also known as VITA 46, where VITA refers to VMEbus International Trade Association) standard (e.g., 3 U form factor, 6 U form factor). One or more of the computer boards could also be referred to as a computer card or printed circuit board. Each of the computer boards has a communication interface that may include pins or the like that provide a physical and electrical interface to a communication link (e.g., backplane communication link). In an embodiment, one of the computer boards in each module computer 304 contains a programmable processor. The programmable processor in each respective module computer 304 is able to execute flight software to control the module computer 304 in which it resides. By controlling the module computer 304 of a respective module, the various components 306 in that module 302 are controlled.

Figure 4:
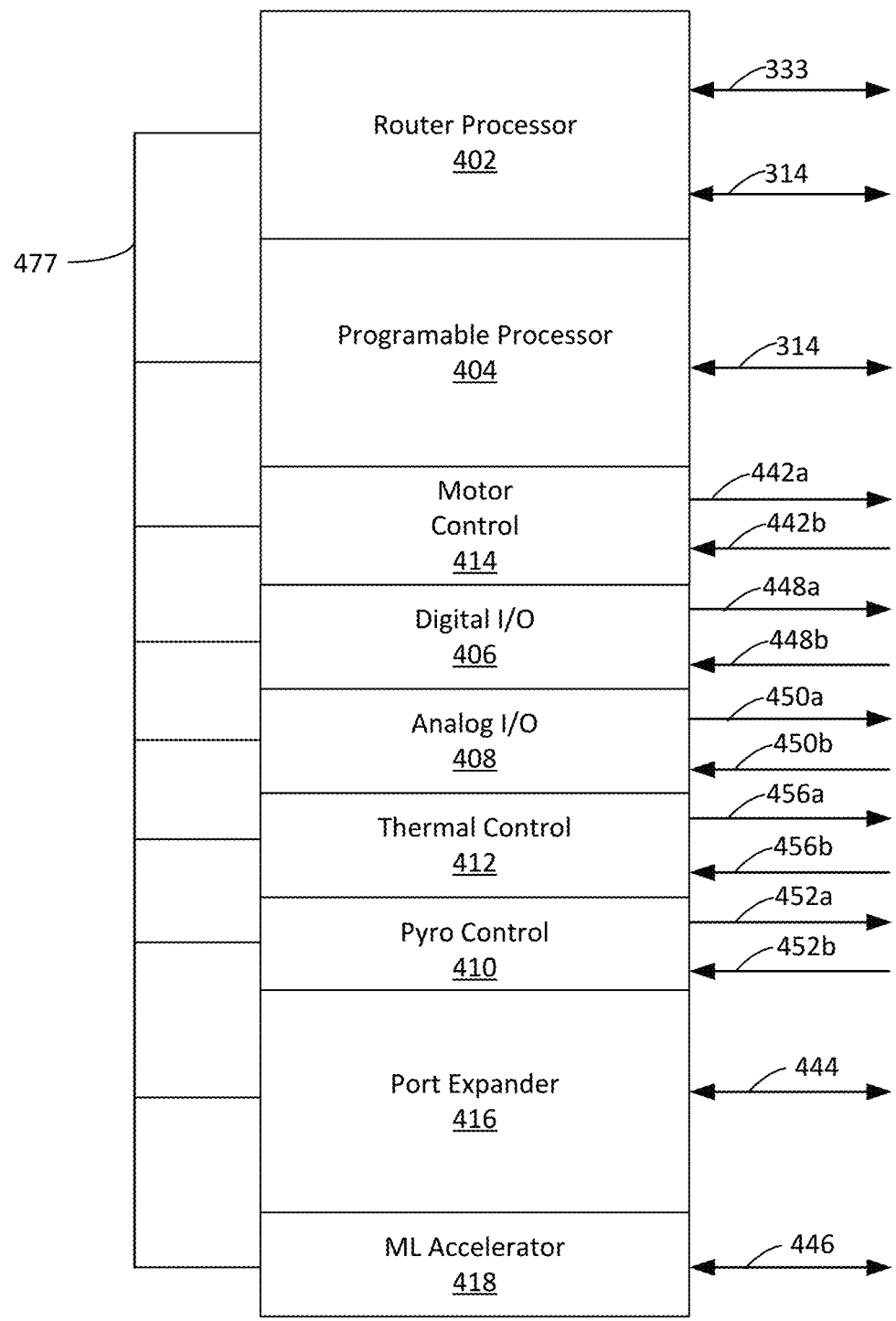
FIG. 4 is a functional diagram of one embodiment of a computer stack.

FIG. 4 is a functional diagram of one embodiment of a computer stack 304. The computer stack 304 may be used in one of the module computers 304 in FIG. 3. A router processor 402 and a programmable processor 404 are depicted. In an embodiment, the router processor 402 and the programmable processor 404 are part of a main computer board. The other functions depicted in FIG. 4 may be implemented on support boards. In some cases, a support board will be able to perform more than one of the functions. The functions include digital input/output I/O 406, analog I/O 408, pyro control 410, thermal control 412, motor control 414, port expander 416, and a machine learning (ML) Artificial Intelligence (AI) accelerator 418. Not all computer stacks 304 will have all these functions. For example, some computer stack 304 might not need a motor control 414. A computer stack 304 could include other functions not depicted in FIG. 4.

In one embodiment, the various functions are implemented on a computer board and one or more support boards. In one embodiment, router processor 402 and programmable processor 404 are implemented a computer board that contains one or more processors and processor readable storage. The processor readable storage is tangible storage such as volatile memory or non-volatile memory. The processor readable storage may include, but is not limited to, random access memory (RAM), static RAM, dynamic RAM, read only memory (ROM), erasable programmable ROM (EPROM), electrically erasable programmable ROM (EEPROM), flash memory, optical storage, magnetic storage, or any other medium that may be used to store and maintain information for access by a processor. The processor readable storage may be used to store one or more flight programs, which may be executed by the programmable processor 404.

The router processor 402 and the programmable processor 404 are each connected to the high speed communication link 314. There is a backplane communication link 477. In one embodiment, the backplane communication link 477 has a high speed data lane and a control lane. The high speed data lane may be an Ethernet link, but is not limited thereto. The control lane may be an SpaceWire/CAN thin data pipe, but is not limited thereto. Both the router processor 402 and the programmable processor 404 are able to communicate with the support boards by way of the backplane communication link 477. The backplane communication link 477 may be implemented with cables. However, wireless communication links are also possible. In an embodiment, the backplane communication link 477 is only used for communication within the computer stack 304. For example, the backplane communication link 477 may be used for communication between the high-speed processor 404 and the support boards that perform the various functions (406-418), as well as for communication between the router processor 402 and the support boards that perform the various functions (406-418).

The various communication links depicted on the right side of the computer stack 304 may be used for communication external to the computer stack 304. The router processor 402 is connected to a high speed communication link 314 and a CAN link 333. The high-speed communication link may be, for example, a 1G Ethernet link. The high-speed communication link 314 allows the router processor 402 to communicate with the router processor 402 and/or the programmable processor 404 of other computer stacks 304.

The CAN may be, for example, RS-422, RS-485 and may allow the router processor 402 to receive commands from ground control. The router processor 402 may be connected to other links such as SpaceWire.

The programmable processor 404 is connected to a high speed communication link 314. In one embodiment, the high speed communication link 314 is used to communication with the router processor 402 and/or programmable processor 404 of another computer stack 304. The programmable processor 404 may be connected to other links such as, for example, SpaceWire, CAN (RS-422, RS-485), and optionally 10G Ethernet.

Communication links/control lines are also depicted for various functions. These various communication links/control lines may be used for sending/receiving signals to/from various components of the spacecraft. The digital I/O 406 has control line 448a for sending out digital pulses and control line 448b for receiving digital telemetry input. The analog I/O 408 has control line 450a for sending out analog signals and control line 450b for receiving analog telemetry input. The pyro control 410 has control line 452a for sending out pryo signals and control line 452b for digital telemetry input. The thermal control 412 has control line 456a for sending DC voltages to heaters and control line 456b for receiving analog inputs from thermistors. The motor control 414 has control line 442a for an H-bridge output and control line 442b for position input. The optional port expander 416 has communication link 444, which may include a 1G Ethernet, SpaceWire, CAN (RS-422, RS-485), and relay contacts. The Machine Language/Artificial Intelligence (ML/AI) 418 has communication link 446, which may include a 10G Ethernet. The various functions 406-418 and their respective links 442-456 are for purpose of illustration.

In an embodiment, the programmable processor 404 of each respective computer stack 304 is also able to execute the flight software to control other stacks. This allows the programmable processor 404 in any of the computer stacks 304 to take over control of a computer stack 304 in another module 302 in the event that the programmable processor 404 in the other computer stack 304 is not operational. Thus, there are multiple programmable processors 404 on the spacecraft 10, which are tasked with doing their own work somewhere on the spacecraft 10. When a programmable processor 404 fails, the other programmable processors 404 may decide which one will take over this work by determining what their processing load is. For example, if one programmable processor 404 is not very busy, a decision will be made to have that programmable processor 404 take on the tasks of the failed programmable processor 404.

In some case, the programmable processors 404 are typically running at <30% of their capabilities, which means any programmable processor 404 can take on the tasks of a failed programmable processor 404 and still be able to perform its main functions. Also, the task allocation can change at any time, depending on the overall system processing requirements. For example, if the propulsion computer has taken over the antenna functions due to a failed antenna computer, if a large propulsion job is coming up, it may decide, or a command may be made from ground control, that the payload repeater computer take over the antenna computer tasks while the propulsion work is being done. This dynamic task allocation for flight needs is possible because, in an embodiment, each computer stack 304 can do 100% of all the functions of each other.

Figure 5:
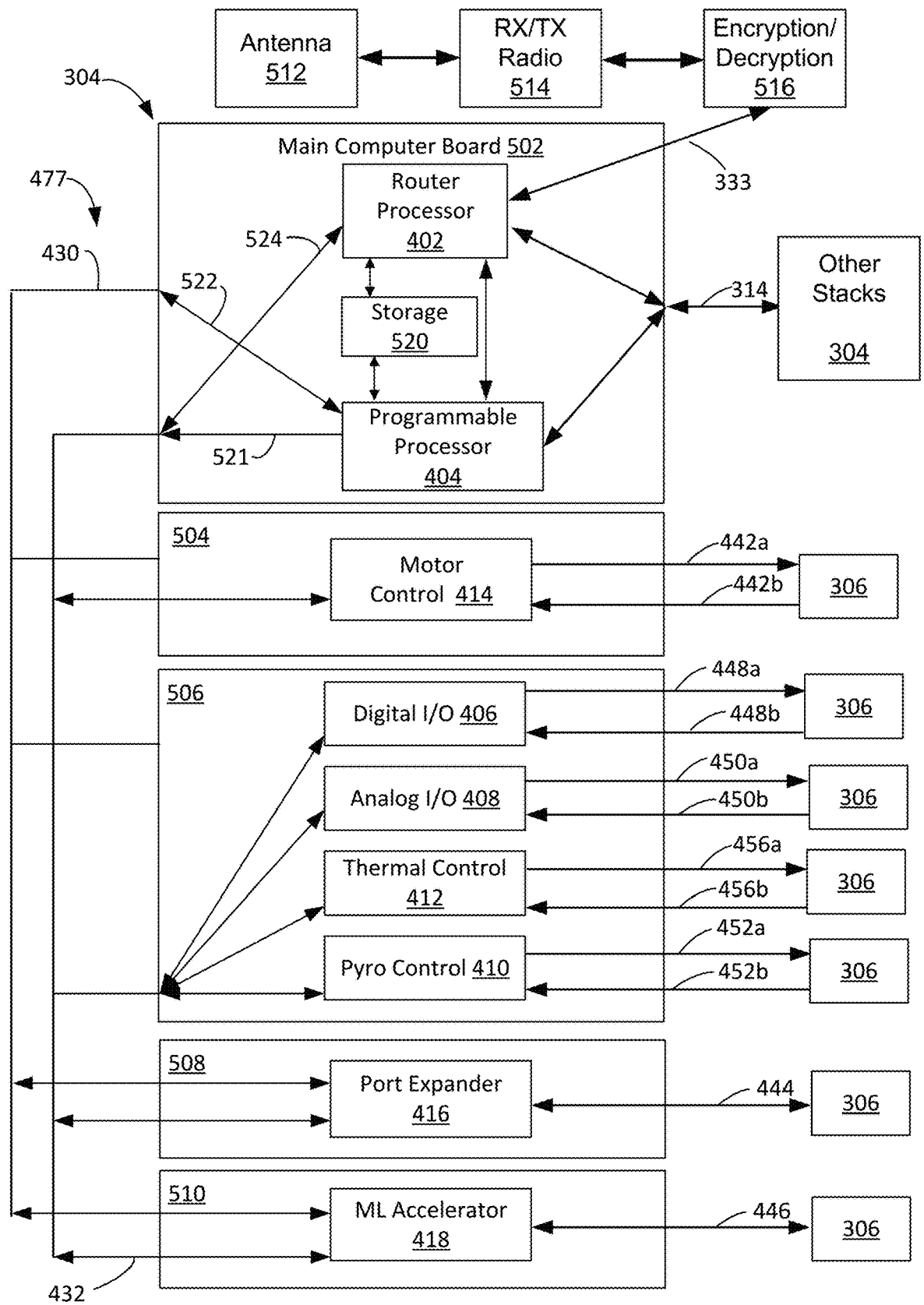
FIG. 5 is a diagram of one embodiment of a computer stack connected to components.

FIG. 5 is a diagram showing an embodiment of a computer stack 304, along with elements connected to the computer stack 304. The computer stack 304 may be used in the system in FIG. 3. The computer stack 304 includes a main computer board 502 and several support (or secondary) boards 504, 506, 508, 510. The main computer board 502 has a router processor 402 and a programmable processor 404. The main computer board 502 also has processor readable storage 520. The processor readable storage 520 is tangible storage such as volatile memory or non-volatile memory. The processor readable storage 520 may include, but is not limited to, random access memory (RAM), static RAM, dynamic RAM, read only memory (ROM), erasable programmable ROM (EPROM), electrically erasable programmable ROM (EEPROM), flash memory, optical storage, magnetic storage, or any other medium that may be used to store and maintain information for access by a processor. The processor readable storage 520 may be used to store a flight program (also referred to as flight control software), which is executed by the programmable processor 404. The flight program includes processor executable instructions. In one embodiment, the storage 520 is used to store processor executable instructions that are executed by the router processor 402.

The programmable processor 404 executes the flight control software that controls the various support boards in the stack 304. The router processor 402 acts as a supervisor and performs routing functions. Commands from ground control are received by the radio receiver/transmitter (RX/TX) 514, which is connected to the antenna 512. An encryption/decryption module 516 is used to encrypt/decrypt communications between the satellite and ground control. The commands are provided to the router processor 402 by way of CAN link 333. The router processor 402 is communicatively coupled to the programmable processor 404 such that the router processor 402 may forward commands to the programmable processor 404 in the stack. The router processor 402 can also forward those commands to other stacks 304 by way of the high speed communication link 314. As will be discuss in more detail below, the router processor 402 can also communicate with the support boards in the stack 304 by way of the backplane communication link 477, which has a data lane 430 and a control lane 432.

In an embodiment, the router processor 402 is very robust and is unlikely to fail. However, the programmable processor 404 could fail. In the event that the programmable processor 404 in the stack fails, then a programmable processor 404 in a different stack 304 is used to control operations in the stack with the failing programmable processor 404. The programmable processor 404 in the other stack 304 is able to take over for the failing programmable processor 404 because the programmable processor 404 in the other stack 304 is able to execute the flight software that the failing programmable processor 404 would otherwise execute. This is in addition to the flight software that the programmable processor 404 in the other stack 304 executes to control its stack 304. Thus, the programmable processor 404 in the other stack may execute two different flight programs at the same time in order to control the support boards in the two stacks 304. Therefore, the system does not require a redundant programmable processor 404, which does not serve a purpose other than being a backup for the failing processor.

The programmable processor 404 has a first link 522 to the data lane 430 and a second link 521 to the control lane 432. The router processor 402 has a link 524 to the control lane 432. In an embodiment, programmable processor 404 sends commands to the various support boards by way of control lane 432. The control lane 432 is connected to the motor control 414 in support board 504. The control lane 432 is also connected digital I/O 406, analog I/O 408, thermal control 412 and pyro control 410 in support board 506. As discussed above, the motor control 414, digital I/O 406, analog I/O 408, thermal control 412 and pyro control 410 have links/control lines to various components 306 in the spacecraft 10. Optionally, the port expander 416 and the ML accelerator 418 may be connected to components 306. Therefore, by sending commands to the various support boards the programmable processor 404 is able to control the various components that are connected to this particular computer stack 304.

In the event that the programmable processor 404 in another computer stack 304 fails, the programmable processor 404 that is still healthy is able to control the various components that are connected to the stack 304 having the failing programmable processor 404. In one embodiment, the healthy programmable processor 404 will sends commands over the communication link 314 to the computer stack with the falling programmable processor 404. The router processor 402 in the computer stack with the falling programmable processor 404 will forward those commands over the backplane to the various support boards by way of control lane 432 in the backplane of the stack with the failing programmable processor 404. Therefore, the healthy programmable processor 404 is able to remotely control the components that are connected to the computer stack 304 having the failing programmable processor 404. Note that the router processor 402 has the capability to bypass the failing programmable processor 404 by way of path 524 in order to communicate with the support boards by way of control lane 432.

As noted, the stack 304 includes a number of support boards 504, 506, 508, 510. In FIG. 5, the functions of digital I/O control, analog I/O control, thermal control, and pyro control are depicted on support board 506; however, such functions are not required to be on the same support board. Each support board is communicatively coupled to the backplane communication link 477. Each support board has a control circuit that are able to communicate on the backplane communication link 477. For example, a support board may have a control circuit that processes packets received on the backplane communication link 477.

As noted, the support boards 504, 506, 508, 510 may be connected to components 306 that are able to perform an aspect of the mission of the spacecraft 10. Each support board has one or more control circuits that are able to control the various components connected to the support board. The control circuits on the support boards depicted in FIG. 5 includes motor control 414, digital I/O 406, analog I/O 408, thermal control 412, pyro control 410, port expander 416, and ML accelerator 418. A control circuit may include an application specific integrated circuit (ASIC), a Field Programmable Gate Array (FPGA), a circuit, a digital logic circuit, an analog circuit, a combination of discrete circuits, gates, or any other type of hardware or combination thereof.

The following examples of components 306 are for purpose of illustration. The motor control 414 may be connected to SADA, wheels, and/or mechanism. The functions (406, 408, 410, 412) in support board 506 may be connected to heaters, switches, valves, pyro releases, and/or position status sensors. The port expander 416 may be connected to external payloads, wheels, and/or legacy hardware. The ML accelerator 418 may be connected to high speed routers and/or other ML accelerators. Thus, the programmable processor 404 in the computer stack 304 is able to control components such as these example components by sending commands to by way of the backplane 477 to the various support boards 504, 506, 508, 510. A different computer stack 304 will have a different set of components attached thereto in order to control some other aspect of the spacecraft's mission; however, there may be some overlap in the types of components in the various stacks. Moreover, the flight programs to control the set of components attached to the various stacks will be different. In an embodiment, the programmable processor 404 in one stack 304 is able to execute the flight software needed to control the components in another stack 304. Thus, a healthy processor 404 in one computer stack 304 is able to control the components 306 connected to a computer stack 304 having a failing processor 404.

Figure 6:
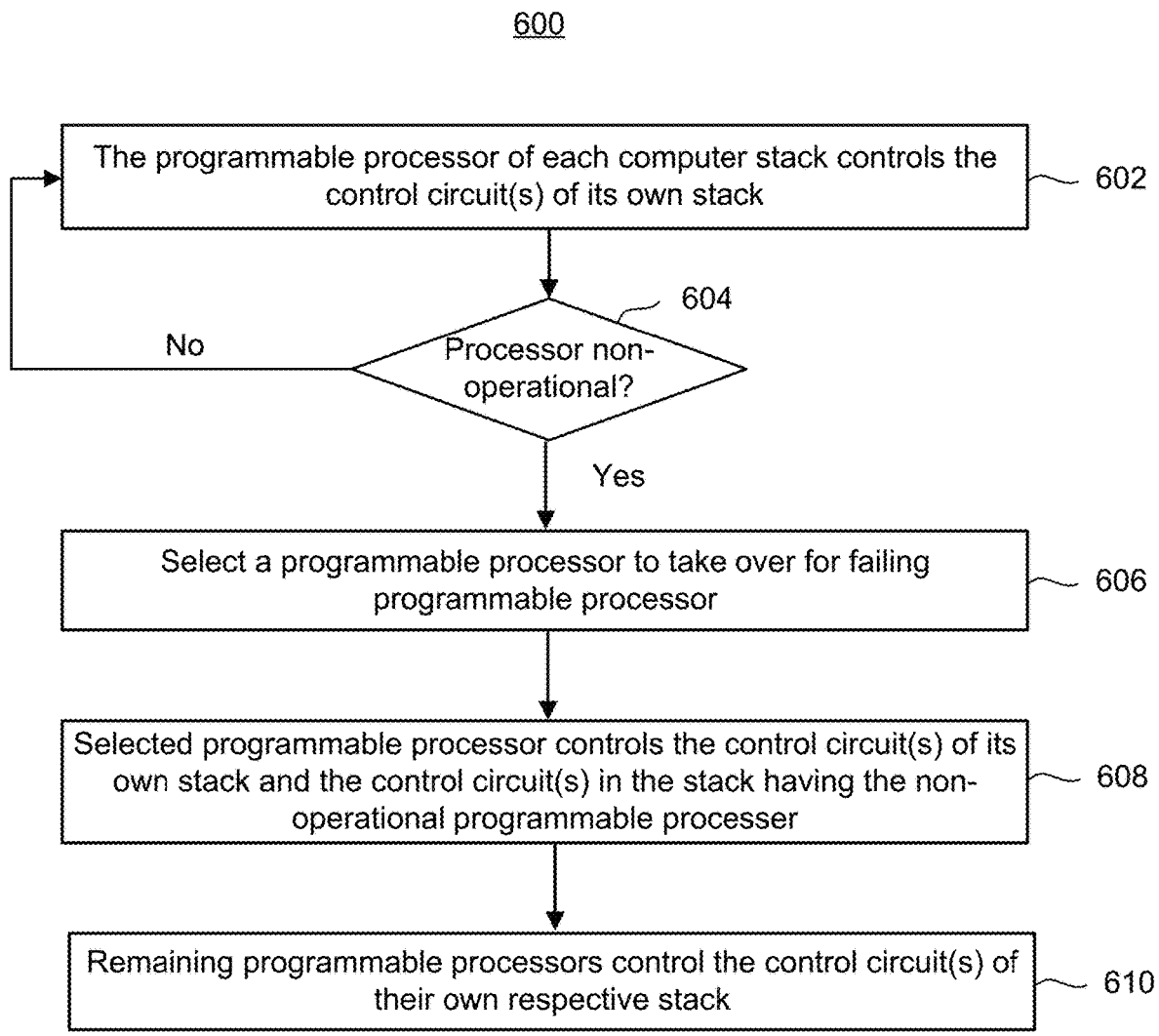
FIG. 6 is a flowchart of one embodiment of a process of operating a spacecraft.

FIG. 6 is a flowchart of an embodiment of a process 600 of operating a spacecraft. The process may be performed in the system depicted in FIG. 3. The process 600 provides for a programmable processor 404 taking over for a failing programmable processor 404. Step 602 includes the programmable processors 404 in each respective computer stack 304 controls the one or more control circuits in the respective computer stack 304. The one or more control circuits will in turn control the components 306 connected to the respective computer stack 304. Therefore, the programmable processors 404 in each respective computer stack 304 will control the execution of the aspect of the spacecraft's mission for which each respective computer stack 304 is responsible.

Step 604 is a determination of whether any of the programmable processors 404 is non-operational (which may also be referred to as failing). Being non-operational means that the programmable processor 404 is, for any reason, unable to control the execution of the aspect of the spacecraft's mission for which each respective computer stack 304 is responsible. In some cases, this will be due to a failure of the programmable processor 404 itself. However, this could also be due to a failure of a component that is essential to the programmable processor 404 such as storage 520. In some cases the failure will be due to factors such as the difficult operating conditions in space. If any of the programmable processors 404 is non-operational, then steps 606-610 are performed.

Step 606 includes selecting a programmable processor 404 to take over for the failing programmable processor 404. In one embodiment, this selection is made by the remaining healthy programmable processors 404. In one embodiment, different programmable processors 404 can take over for the failing programmable processor 404 at different times. For example, a load balancing algorithm may be used to select a programmable processor 404.

Step 608 includes the selected programmable processor 404 controlling the one or more control circuits in the computer stack 304 having the failing programmable processor 404. The selected programmable processor 404 continues to control the one or more control circuits in its own computer stack 304.

Step 610 includes the other healthy programmable processors 404 continuing to control the one or more control circuits in their own computer stacks 304.

Figure 7:
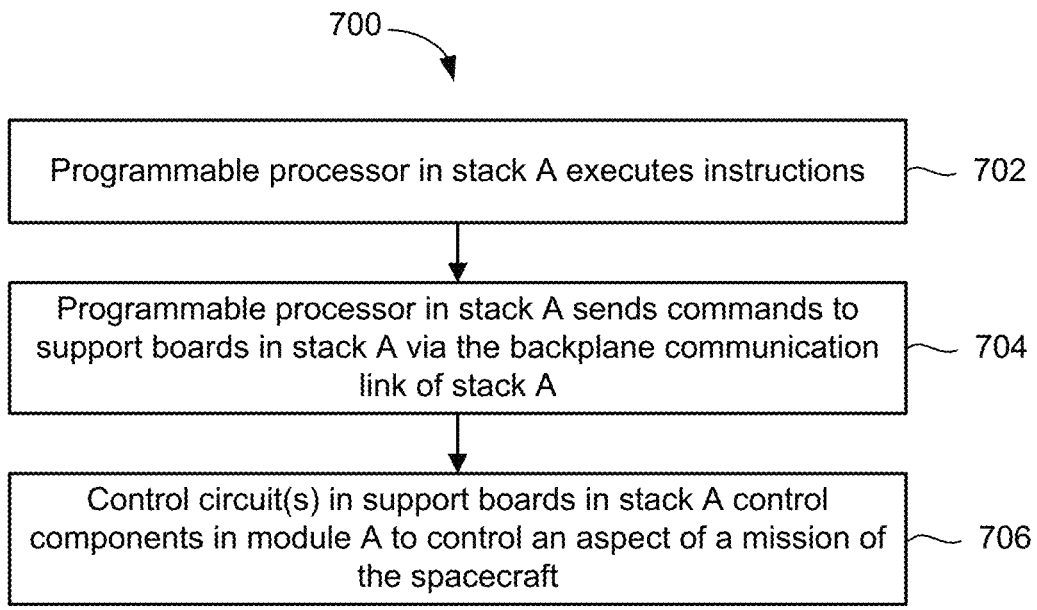
FIG. 7 is a flowchart of one embodiment of a process of a programmable processor controlling operation of a computer stack.

FIG. 7 is a flowchart of one embodiment of a process 700 of a programmable processor 404 controlling operation of a computer stack 304. The process 700 provides further details for an embodiment of step 602 in process 600. The process 700 may be performed in the system depicted in FIG. 3. For the sake of discussion, the computer stack 304 will be referred to as stack A. For the sake of discussion, stack A is in module A. As an example, module A is for flight propulsion. Thus computer stack 304 is responsible for carrying out the aspect of flight propulsion.

Step 702 includes the programmable processor 404 in stack A executing processor executable instructions (also referred to as "code") to control stack A. For the sake of discussion, these are instructions of flight program A. In an embodiment, the programmable processor 404 accesses the instructions from storage 520 on the main board 502 in stack A.

Step 704 includes the programmable processor 404 in stack A sending commands by way of the backplane communication link 477 to support boards in stack A. For example, the programmable processor 404 sends commands by way of control lane 432 to support boards 504, 506, 508, and 510 (see FIG. 5).

Step 706 includes the control circuit(s) in the support boards in stack A controlling components 306 in module A in response to the commands from the programmable processor 404 in stack A. For example, motor control 414 may control wheels and/or mechanisms, pyro control 410 may control pyro releases, thermal control 412 may control heaters, etc. By controlling the various components 306 connected to stack A the aspect of the mission of the spacecraft associated with stack A is carried out.

The programmable processor 404 in stack A also is able to run flight programs for other computer stacks 304. An example will be discussed in which the programmable processor 404 is stack B is at least temporarily non-operational. In an embodiment, the operative programmable processors decide which of the operative programmable processors will take over for the in inoperative programmable processor is stack B. For the sake of example, the programmable processor in stack A will take over for at least some period of time.

Figure 8:
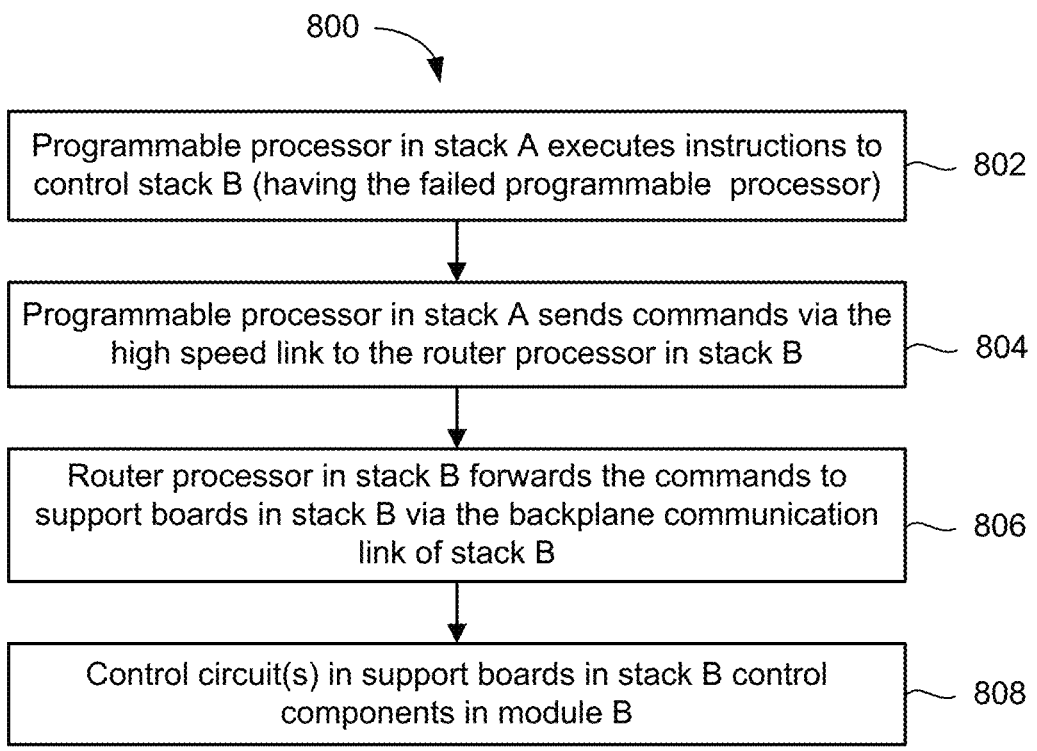
FIG. 8 is a flowchart of one embodiment of a process of a programmable processor controlling operation of another computer stack that has an inoperative programmable processor.

FIG. 8 is a flowchart of one embodiment of a process 800 of a programmable processor 404 controlling operation of another computer stack 304 that has an inoperative programmable processor 404. The process 800 may be performed in an embodiment of step 608 of process 600. As noted above, in this example, the programmable processor 404 in stack B is operative. The process 800 may be performed in the system depicted in FIG. 3.

Step 802 includes the programmable processor 404 in stack A executing processor executable instructions (or "code") to control stack B. For the sake of discussion, these are instructions of flight program B. In an embodiment, the programmable processor 404 in stack A accesses the instructions from storage 520 on the main board 502 in stack A. Note that the programmable processor 404 in stack A may continue to execute instructions of flight program A to control operations in stack A. Step 802 may include generating commands that will be used to control the control circuit(s) in stack B.

Step 804 includes the programmable processor 404 in stack A sending the commands by way of the high speed communication link 314 to the router processor 402 in stack B. The commands may be sent within data packets.

Step 806 includes the router processor 402 in stack B forwarding the commands by way of the backplane communication link 477 to support boards in stack B. In an embodiment, the router processor 402 bypasses the failing programmable processor 404 in stack B by sending the commands directly to the control lane 432.

Step 808 includes the control circuit(s) in the support boards in stack B controlling components 306 in module B in response to the commands forwarded by the router processor 402. Thus, the programmable processor 404 in stack A is able to control the control circuit(s) in the support boards in stack B when the programmable processor 404 in stack B is inoperative. Thus, the programmable processor 404 in stack A is able to control control circuit(s) in both stack A and stack B at the same time. Moreover, there is no need for a redundant processor (that has no other function) to take over for the inoperative programmable processor 404 in stack B.

Figure 9:
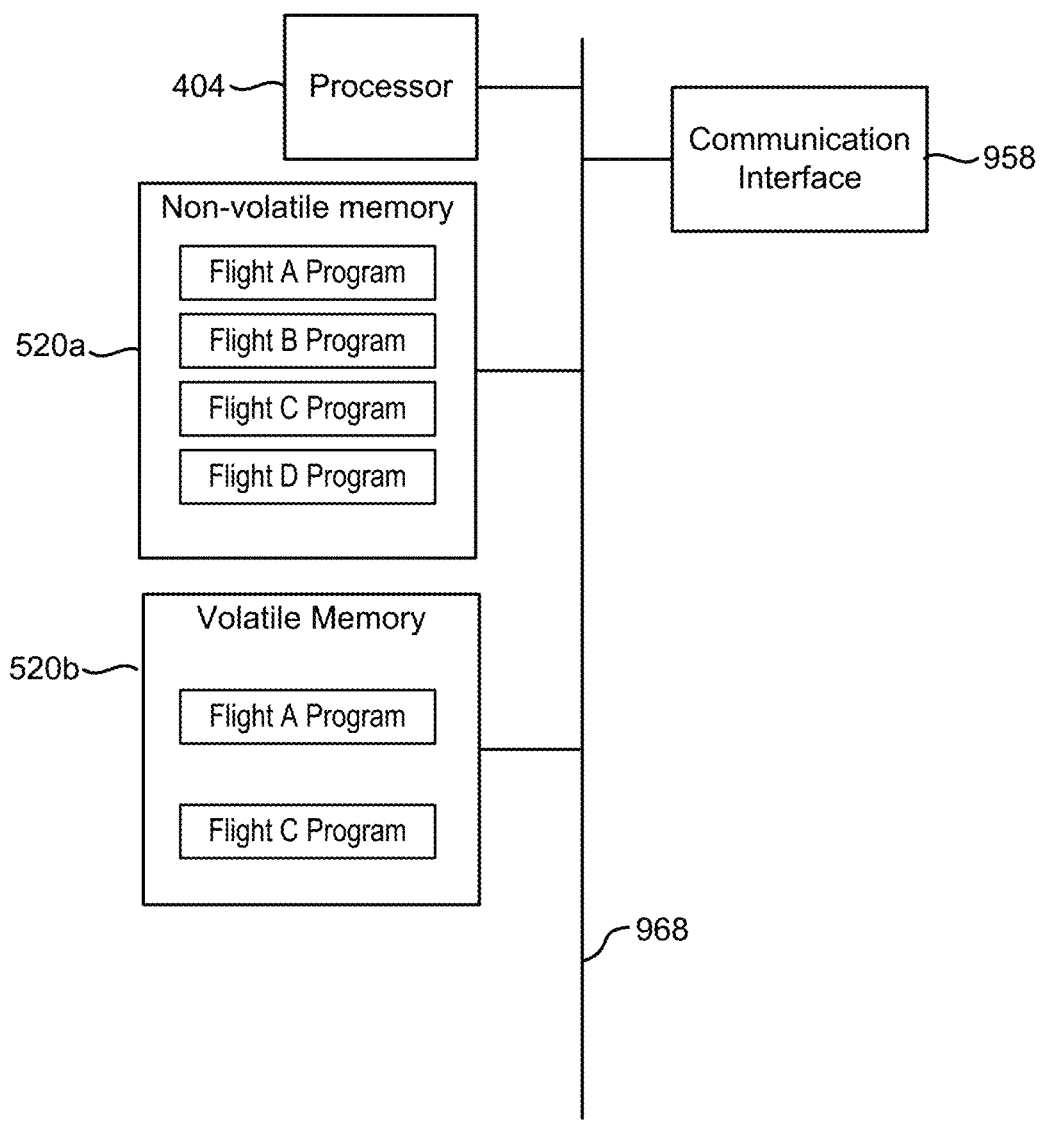
FIG. 9 is a block diagram of one example embodiment of a computing system that can be used to implement programmable processor.

FIG. 9 is a block diagram of one example embodiment of a computing system that can contain programmable processor 404. The computer system of FIG. 9 includes a programmable processor 404, volatile memory 520b, non-volatile memory 520a, and a communication interface 958. Volatile memory 520b and non-volatile memory 520a are one implementation of storage 520 in FIG. 5.

In an embodiment, programmable processor 404 contain a single microprocessor. In an embodiment, programmable processor 404 contains a plurality of microprocessors for configuring the computer system as a multi-processor system. Volatile memory 520b stores, in part, instructions and data for execution by processor 404. In embodiments where the proposed technology is wholly or partially implemented in software, volatile memory 520b can store the executable code when in operation. Volatile memory 520b may also be referred to as main memory. Volatile memory 520b may include banks of dynamic random-access memory (DRAM) as well as high speed cache memory.

For purposes of simplicity, the components shown in FIG. 9 are depicted as being connected via a single bus 968. However, the components may be connected through one or more data transport means. For example, processor 404 and main memory 520b may be connected via a local microprocessor bus, and the non-volatile memory 520a and communication interface 958 may be connected via one or more input/output (I/O) buses. Non-volatile memory 520a may be implemented with ROM, a solid state drive, an optical disk drive or other a non-volatile storage device for storing data and instructions for use by processor 404. In one embodiment, non-volatile memory 520a stores flight program software. In an embodiment, the non-volatile memory 520a stores flight program software for a number of different computer stacks 304. In FIG. 9, the non-volatile memory 520a stores flight A program software, flight B program software, flight C program software, and flight D program software. Each flight program software may be used to control operations for a different stack (e.g., stacks 304a, 304b, 304c, and 304d). However, it is not required that the mass storage device 520a in every computer stack 304 store the flight program software for every other stack, as the flight program software could be transferred over the high speed communication links 314 from another stack if needed.

The volatile memory 520b is depicted as having Flight A program and Flight C program to illustrate a situation in which the programmable processor 404 is executing the flight programs for two different stacks at the same time.

Note that it is not required that the entire flight program be loaded from non-volatile memory 520a into volatile memory 520b. During normal operation, when all of the programmable processors 404 are operational, the programmable processor 404 will only execute one of the flight programs. Hence, during normal conditions, main memory 520b will only contain one flight program.

The communication interface 958 may include a network interface for connecting the computer system to a network, a router, etc. The communication interface 958 is configured to communicate on the high speed communication link 314, as well as the backplane 477 (e.g., data 430, control 432).

Example communication interfaces include, but are not limited to, Ethernet, SpaceWire, RS-422, RS-485, and Controller Area Network (CAN bus).

In view of the foregoing, a first embodiment includes a distributed computer system for a spacecraft. The distributed computer system comprises a plurality of computer nodes. Each computer node is connected to a set of components that carry out an aspect of a mission of the spacecraft associated with the computer node. Each computer node comprises one or more control circuits communicatively coupled to the set of components associated with the respective computer node. The one or more control circuits are configured to control the set of components. The computer node comprises one or more processor readable storage devices that store processor executable instructions. The computer node comprises a router processor coupled to the one or more processor readable storage devices. The computer node comprises a programmable processor coupled to the one or more processor readable storage devices. The programmable processor is communicatively coupled to the router processor of the respective computer node and the one or more control circuits of the respective computer node. The processor executable instructions are for programming the programmable processor to: issue first commands to the one or more control circuits of the respective computer node to control the set of the components connected to the respective computer node to carry out the aspect of the mission associated with the respective computer node; and in response to the programmable processor in particular computer node being non-operational, send second commands to the router processor in the particular computer node to control the set of the components connected to the particular computer node to carry out the aspect of the mission associated with the particular computer node. The processor executable instructions are for programming the router processor of the particular computer node to route the second commands to the one or more control circuits to control the set of the components connected to the particular computer node to carry out the aspect of the mission associated with the particular computer node.

In a second embodiment, and in furtherance to the first embodiment, each computer node further comprises: at least one support board communicatively coupled to the programmable processor and to the router processor of the respective computer node, wherein the at least one support board contains the one or more control circuits of the respective computer node; and a backplane communication link that communicatively couples the at least one support board of the respective computer node to the programmable processor and to the router processor of the respective computer node.

In a third embodiment, and in furtherance to the second embodiment, the processor executable instructions of each respective computer node are further for programming the programmable processor of each respective computer node to issue the commands to the at least one support board of the respective computer node over the backplane communication link to control the one or more control circuits to control the set of the components that carry out the aspect of the mission associated with the respective computer node.

In a fourth embodiment, and in furtherance to any of the first to third embodiments, the processor executable instructions of each respective computer node are further for programming the programmable processor of each respective computer node to communicate indirectly with the one or more control circuits on the at least one support board of a computer node having a non-operational programmable processor by sending packets over a high speed communication link to the router processor of the computer node having the non-operational programmable processor.

In a fifth embodiment, and in furtherance to any of the first to fourth embodiments, the processor executable instructions of each respective computer node are further for programming the router processor of the computer node with the non-operational programmable processor to forward the packets to the one or more control circuits on the at least one support board of the computer node having the non-operational programmable processor via a backplane communication link of the computer node having the non-operational programmable processor In a sixth embodiment, and in furtherance to any of the first to fifth embodiments, the processor executable instructions of each respective computer node are further for programming the router processor of a respective computer node to route information to the programmable processor of the respective computer node.

In a seventh embodiment, and in furtherance to any of the first to sixth embodiments, the processor executable instructions of each respective computer node are further for programming the router processor of a respective computer node to route information to the other computer nodes by way of high speed communication links.

In an eighth embodiment, and in furtherance to any of the first to seventh embodiments, the processor executable instructions of each respective computer node are further for programming the router processor of a respective computer node to: receive commands from a radio transceiver of the spacecraft; and forward the received commands to the programmable processor of the respective computer node.

In a ninth embodiment, and in furtherance to any of the first to eighth embodiments, the processor executable instructions of each respective computer node are further for programming the programmable processors to determine which of the programmable processors is to control the one or more control circuits of a computer node having a non-operational programmable processor.

In a tenth embodiment, and in furtherance to any of the first to ninth embodiments, the set of components connected to a first computer node of the plurality of computer nodes is configured to control an attitude of the spacecraft. The processor executable instructions of the first computer node are further for programming the programmable processor in the first computer node to execute a first flight software program to control the attitude of the spacecraft. The set of components connected to a second computer node of the plurality of computer nodes is configured to control propulsion of the spacecraft. The processor executable instructions of the second computer node are further for programming the programmable processor in the second computer node to execute a second flight software program to control propulsion of the spacecraft. The set of components connected to a third computer node of the plurality of computer nodes is configured to control a payload of the spacecraft. The processor executable instructions of the third computer node are further for programming the programmable processor in the third computer node to execute a third flight software program to control the payload of the spacecraft.

In an eleventh embodiment, and in furtherance to any of the first to tenth embodiments the processor executable instructions of each respective computer node are further for programming the programmable processor of each of the first, the second, and the third computer nodes to execute the first flight software program, the second flight software program, and the third flight software program.

In a twelfth embodiment, and in furtherance to any of the first to eleventh embodiments the processor executable instructions of each respective computer node are further for programing the programmable processor of each of the first, the second, and the third computer nodes to execute two of the first, the second, and the third flight software programs at the same time to control operation of two of the computer nodes at the same time.

An embodiment includes a method of operating a spacecraft having a plurality of computer nodes. The method comprises executing, by a first programmable processor in a first computer node of the plurality of computer nodes, a first set of processor executable instructions to cause the first programmable processor to issue first commands to first one or more control circuits connected to a first set of components in the spacecraft. The method comprises controlling, by the first one or more control circuits in response to the first commands, a first set of components to control a first aspect of a mission of the spacecraft. The method comprises executing, by a second programmable processor in a second computer node of the plurality of computer nodes, a second set of processor executable instructions to cause the second programmable processor to issue second commands to second one or more control circuits connected to a second set of components in the spacecraft. The method comprises controlling, by the second one or more control circuits in response to the second commands, a second set of components to control a second aspect of a mission of the spacecraft. The method comprises responsive to the first programmable processor in the first computer node being non-operational, executing the first set of processor executable instructions by the second programmable processor of the second computer node to generate the first commands and executing a third set of processor executable instructions by the second programmable processor to cause the second programmable processor to forward packets over a high speed communication link from the second computer node to the first computer node, wherein the packets contain the first commands. The method comprises routing the packets, by a router processor of the first computer node, to the first one or more control circuits. The method comprises controlling, by the first one or more control circuits in response to the first commands in the packets, the first set of components to control the first aspect of the mission of the spacecraft while the first programmable processor is non-operational.

One embodiment includes a spacecraft comprising a plurality of components configured to carry out a mission of the spacecraft. The spacecraft comprises a plurality of computer stacks communicatively coupled by communication links. Each computer stack is connected to a set of the components that carry out an aspect of the mission of the spacecraft assigned to the respective computer stack. Each computer stack comprises a programmable processor, a router processor communicatively coupled to the programmable processor, one or more processor readable storage devices in communication with the programmable processor and the router processor, and at least one support board communicatively coupled to the programmable processor and to the router processor via a backplane communication link. Each support board comprises one or more control circuits configured to control components of the spacecraft connected to the respective support board. The processor readable storage device stores code for programming the programmable processor of a respective computer stack to: execute a flight program to control the one or more control circuits in each support board in the respective computer stack; execute flight programs to control the one or more control circuits in support boards in other computer stacks in response to a failure of the programmable processor in another computer stack; and forward packets over a first of the communication links to the router processor in the computer stack having a failing programmable processor in order to control the one or more control circuits in the support boards in the computer stack having the failing programmable processor. The processor readable storage device stores code for programming the router processor of each respective stack to route the packets received on the first communication link to the at least one support board in the respective stack via the backplane communication link in response to a failure of the programmable processor in the respective stack.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. A distributed computer system for a spacecraft, the system comprising:
   a plurality of computer nodes, wherein each computer node is connected to a set of components that carry out an aspect of a mission of the spacecraft associated with the computer node, wherein each computer node comprises:
      one or more control circuits communicatively coupled to the set of components associated with the respective computer node, wherein the one or more control circuits are configured to control the set of components;
      one or more processor readable storage devices that store processor executable instructions;
      a router processor coupled to the one or more processor readable storage devices;
      a programmable processor coupled to the one or more processor readable storage devices, wherein the programmable processor is communicatively coupled to the router processor of the respective computer node and the one or more control circuits of the respective computer node, wherein the processor executable instructions are for programming the programmable processor to:
         issue first commands to the one or more control circuits of the respective computer node to control the set of the components connected to the respective computer node to carry out the aspect of the mission associated with the respective computer node; and
         in response to the programmable processor in particular computer node being non-operational, send second commands to the router processor in the particular computer node to control the set of the components connected to the particular computer node to carry out the aspect of the mission associated with the particular computer node; and
      wherein the processor executable instructions are for programming the router processor of the particular computer node to route the second commands to the one or more control circuits to control the set of the components connected to the particular computer node to carry out the aspect of the mission associated with the particular computer node.

2. The distributed computer system of claim 1, wherein each computer node further comprises:
   at least one support board communicatively coupled to the programmable processor and to the router processor of the respective computer node, wherein the at least one support board contains the one or more control circuits of the respective computer node; and
   a backplane communication link that communicatively couples the at least one support board of the respective computer node to the programmable processor and to the router processor of the respective computer node.

3. The distributed computer system of claim 2, wherein the processor executable instructions of each respective computer node are further for programming the programmable processor of each respective computer node to issue the commands to the at least one support board of the respective computer node over the backplane communication link to control the one or more control circuits to control the set of the components that carry out the aspect of the mission associated with the respective computer node.

4. The system of claim 2, wherein the processor executable instructions of each respective computer node are further for programming the programmable processor of each respective computer node to:
   communicate indirectly with the one or more control circuits on the at least one support board of a computer node having a non-operational programmable processor by sending packets over a high speed communication link to the router processor of the computer node having the non-operational programmable processor.

5. The system of claim 4, wherein the processor executable instructions of each respective computer node are further for programming the router processor of the computer node with the non-operational programmable processor to forward the packets to the one or more control circuits on the at least one support board of the computer node having the non-operational programmable processor via the backplane communication link of the computer node having the non-operational programmable processor.

6. The system of claim 1, wherein the processor executable instructions of each respective computer node are further for programming the router processor of a respective computer node to:
   route information to the programmable processor of the respective computer node.

7. The system of claim 1, wherein the processor executable instructions of each respective computer node are further for programming the router processor of a respective computer node to:
   route information to the other computer nodes by way of high speed communication links.

8. The system of claim 1, wherein the processor executable instructions of each respective computer node are further for programming the router processor of a respective computer node to:
   receive commands from a radio transceiver of the spacecraft; and
   forward the received commands to the programmable processor of the respective computer node.

9. The system of claim 1, wherein the processor executable instructions of each respective computer node are further for programming the programmable processors to determine which of the programmable processors is to control the one or more control circuits of a computer node having a non-operational programmable processor.

10. The system of claim 1, wherein:
   the set of components connected to a first computer node of the plurality of computer nodes is configured to control an attitude of the spacecraft, wherein the processor executable instructions of the first computer node are further for programming the programmable processor in the first computer node to execute a first flight software program to control the attitude of the spacecraft;
   the set of components connected to a second computer node of the plurality of computer nodes is configured to control propulsion of the spacecraft, wherein the processor executable instructions of the second computer node are further for programming the programmable processor in the second computer node to execute a second flight software program to control propulsion of the spacecraft; and
   the set of components connected to a third computer node of the plurality of computer nodes is configured to control a payload of the spacecraft, wherein the processor executable instructions of the third computer node are further for programming the programmable processor in the third computer node to execute a third flight software program to control the payload of the spacecraft.

11. The system of claim 10, wherein the processor executable instructions of each respective computer node are further for programming the programmable processor of each of the first, the second, and the third computer nodes to execute the first flight software program, the second flight software program, and the third flight software program.

12. The system of claim 11, wherein the processor executable instructions of each respective computer node are further for programing the programmable processor of each of the first, the second, and the third computer nodes to execute two of the first, the second, and the third flight software programs at the same time to control operation of two of the computer nodes at the same time.

13. A method of operating a spacecraft having a plurality of computer nodes, the method comprising:
   executing, by a first programmable processor in a first computer node of the plurality of computer nodes, a first set of processor executable instructions to cause the first programmable processor to issue first commands to first one or more control circuits connected to a first set of components in the spacecraft;
   controlling, by the first one or more control circuits in response to the first commands, a first set of components to control a first aspect of a mission of the spacecraft;
   executing, by a second programmable processor in a second computer node of the plurality of computer nodes, a second set of processor executable instructions to cause the second programmable processor to issue second commands to second one or more control circuits connected to a second set of components in the spacecraft;
   controlling, by the second one or more control circuits in response to the second commands, a second set of components to control a second aspect of a mission of the spacecraft;
   responsive to the first programmable processor in the first computer node being non-operational, executing the first set of processor executable instructions by the second programmable processor of the second computer node to generate the first commands and executing a third set of processor executable instructions by the second programmable processor to cause the second programmable processor to forward packets over a high speed communication link from the second computer node to the first computer node, wherein the packets contain the first commands;
   routing the packets, by a router processor of the first computer node, to the first one or more control circuits; and
   controlling, by the first one or more control circuits in response to the first commands in the packets, the first set of components to control the first aspect of the mission of the spacecraft while the first programmable processor is non-operational.

14. The method of claim 13, wherein executing, by the first programmable processor, the first set of processor executable instructions to cause the first programmable processor to issue first commands to the first one or more control circuits comprises:
   communicating directly, by the first programmable processor, with the first one or more control circuits via a backplane communication link of the first computer node.

15. The method of claim 14, wherein routing the packets, by the router processor of the first computer node comprises communicating directly, by the router processor, with the first one or more control circuits via the backplane communication link of the first computer node.

* * * * *